United States Patent
Otaki et al.

(10) Patent No.: US 9,393,748 B2
(45) Date of Patent: Jul. 19, 2016

(54) DIRECT BLOW-MOLDED CONTAINER MANUFACTURING METHOD AND PACKAGE

(75) Inventors: Ryoji Otaki, Hiratsuka (JP); Kenji Kouno, Hiratsuka (JP); Hiroshi Kobayashi, Hiratsuka (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 202 days.

(21) Appl. No.: 14/129,423

(22) PCT Filed: Jun. 12, 2012

(86) PCT No.: PCT/JP2012/065042
§ 371 (c)(1),
(2), (4) Date: Feb. 10, 2014

(87) PCT Pub. No.: WO2013/002022
PCT Pub. Date: Jan. 3, 2013

(65) Prior Publication Data
US 2014/0183092 A1 Jul. 3, 2014

(30) Foreign Application Priority Data
Jun. 30, 2011 (JP) .................................. 2011-146810

(51) Int. Cl.
*B29D 22/00* (2006.01)
*B29C 47/20* (2006.01)
(Continued)

(52) U.S. Cl.
CPC .............. *B29D 22/003* (2013.01); *B29C 47/20* (2013.01); *B29C 47/705* (2013.01); *B65D 1/00* (2013.01);
(Continued)

(58) Field of Classification Search
None
See application file for complete search history.

(56) References Cited

U.S. PATENT DOCUMENTS

| 3,962,396 A | 6/1976 | Ono et al. |
|---|---|---|
| 4,509,907 A | 4/1985 | Ratheiser |

(Continued)

FOREIGN PATENT DOCUMENTS

| CN | 1253875 A | 5/2000 |
|---|---|---|
| CN | 1911993 A | 2/2007 |

(Continued)

OTHER PUBLICATIONS

International Search Report issued Aug. 21, 2012 in Application No. PCT/JP2012/065042.

(Continued)

*Primary Examiner* — Monica Huson
(74) *Attorney, Agent, or Firm* — Oblon, McClelland, Maier & Neustadt, L.L.P.

(57) ABSTRACT

The present invention provides a method of manufacturing a practical direct-blow molded container having excellent barrier property against fuels, chemicals, various gases including oxygen. The method of manufacturing a practical direct-blow molded container containing the metaxylylene group-containing polyamide (C) being dispersed and layered in the polyolefin (A) includes using a die provided with a die body having a flow hole in which the melted resin extruded from an extruder flows and a cylindrical hollow having an opening in the lower side and the flow hole in the upper side, the opening and the flow hole opening downward and upward, respectively, a mandrel having a tip in the upper side, the tip pointing to the opening of the tip of the flow hole, a flow path clearance formed between the hollow of the die body and the mandrel, the flow path clearance defining a resin flow path, and a support part formed in the flow path clearance, the support part holding the mandrel in the hollow of the die body.

6 Claims, 7 Drawing Sheets

(51) Int. Cl.
  *B29C 47/70* (2006.01)
  *B65D 1/00* (2006.01)
  *B29C 47/00* (2006.01)
  *B29C 49/04* (2006.01)
  *B29L 31/00* (2006.01)
  *B29K 77/00* (2006.01)

(52) U.S. Cl.
  CPC ............ *B29C 47/0023* (2013.01); *B29C 49/04* (2013.01); *B29K 2077/00* (2013.01); *B29K 2995/0067* (2013.01); *B29K 2995/0069* (2013.01); *B29L 2031/715* (2013.01); *B29L 2031/7158* (2013.01); *B29L 2031/7172* (2013.01)

(56) References Cited

U.S. PATENT DOCUMENTS

| | | |
|---|---|---|
| 2005/0276876 A1 | 12/2005 | Koetke et al. |
| 2006/0270799 A1 | 11/2006 | Sato et al. |

FOREIGN PATENT DOCUMENTS

| | | |
|---|---|---|
| CN | 201089212 Y | 7/2008 |
| CN | 101474892 A | 7/2009 |
| DE | 1 940 195 A1 | 3/1971 |
| DE | 36 16 396 A1 | 11/1987 |
| EP | 0 279 321 A2 | 8/1988 |
| GB | 2 134 844 A | 8/1984 |
| JP | 55-121017 | 9/1980 |
| JP | 58-209562 | 12/1983 |
| JP | 4-122021 U | 10/1992 |
| JP | 5-104524 | 4/1993 |
| JP | 6-328634 | 11/1994 |
| JP | 7-52333 | 2/1995 |
| JP | 7-23527 U | 5/1995 |
| JP | 7-125043 | 5/1995 |
| JP | 9-300442 | 11/1997 |
| JP | 2005-206806 | 8/2005 |
| JP | 2007-177208 | 7/2007 |

OTHER PUBLICATIONS

Combined Chinese Office Action and Search Report issued Mar. 23, 2015 in Patent Application No. 201280031748.7 (with English Translation of Category).

Extended European Search Report issued Jul. 30, 2015 in Patent Application No. 12805336.0.

Office Action issued Mar. 22, 2016 in Rusian Patent Application No. 2013158166/05(090575) (with English translation).

David Brooks et al., "PET Packaging Technology" 2006.

DIRECT BLOW-MOLDED CONTAINER MANUFACTURING METHOD AND PACKAGE

CROSS REFERENCE TO RELATED APPLICATIONS

The present application is a 35 U.S.C. §371 national stage patent application of International patent application PCT/JP2012/065042, filed on Jun. 12, 2012, published as WO/2013/002022 on Jan. 3, 2013, the text of which is incorporated by reference, and claims the benefit of the filing date of Japanese application no. 2011-146810, filed on Jun. 30, 2011, the text of which is also incorporated by reference.

TECHNICAL FIELD

The present invention relates to a method of manufacturing a container formed by direct blow molding and a package including the container.

BACKGROUND ART

Containers for preserving hydrocarbons, various chemicals, bathroom furnishings, sanitary products, cosmetics, beverages, and food pastes includes, for example, a fuel tank for cars or small engines, a bottle, a can, and a tube. In many cases, metal and glass conventionally used as the material are substituted with plastic. Plastic is characterized by saving the weight, eliminating rust prevention treatment, reducing breakability, and improving the degree of freedom of shape.

Many of the containers for preserving various chemicals, bathroom furnishings, sanitary products, cosmetics, beverages, and food pastes are formed by polyolefins such as high density polyethylenes (hereinafter sometimes abbreviated as "HDPE"), linear low density polyethylenes (hereafter sometimes abbreviated as "LLDPE"), polypropylenes (hereafter sometimes abbreviated as "PP"), and polyesters such as polyethylene terephthalates (hereafter sometimes abbreviated as "PET"). Many of the containers have excellent mechanical strength, formability, design, and economic efficiency. However, the containers have the disadvantages that the component of the stored object disperses in the atmosphere through the wall of the containers to impair the function of the stored object and that oxygen enters from the outside through the wall of a container to oxidize the stored object so as to impair the taste.

To eliminate these disadvantages, the technology imparting a gas barrier property to the plastic container is used. For example, the method of forming a multilayer structure by layering a barrier resin such as an ethylene-vinyl alcohol copolymer resin (hereinafter sometimes abbreviated as "EVOH") as the interlayer of a plastic container is known (see Patent documents 1 and 2). The method of manufacturing a single-layer container from the composition in which a polyamide such as nylon 6 or 6/66 and HDPE are blended with an adhesive resin is also known (see Patent documents 3 and 4). Furthermore, the method of manufacturing the single-layer container by using polymetaxylylene adipamide (hereafter sometimes abbreviated as "N-MXD6") with a more excellent barrier property than that of a polyamide such as nylon 6 is disclosed (see Patent documents 5 and 6).

Conventionally, such a container is manufactured in manufacturing facilities equipped with an extruder 100 and a cylindrical die 110 as shown in FIGS. 5 and 7. The above-mentioned resin is fed to the extruder 100, melted and mixed, formed in a cylindrical shape, passing through the cylindrical die 110, and extruded as a cylindrical parison from an outlet 114 in the lower part 112 of the cylindrical die 110.

Generally, the cylindrical die 110 producing a single-layer container is provided with a die body 120 having a hollow 122, and a mandrel 130 placed in the hollow 122 of the die body 120, the mandrel 130 forming resin flow paths 150.

As shown in FIGS. 5 and 6, the mandrel 130 has a recess 132 with a shape of a heart or a spiral, which is fixed to the upper part 116 of the cylindrical die 110 so as to form the resin flow paths 150 in the hollow 122. In the cylindrical die 110 equipped with this mandrels 130, melted resin fed from the extruder 100 to a resin inlet provided in the mandrel 130 is divided by the cylindrical side of the mandrel 130 to flow into two directions. The divided resin flows around the mandrel 130 along the resin flow paths 150 and the recess 132 formed on the mandrel 130 to be gradually formed in a cylindrical shape, and then extruded from the outlet 114 of the cylindrical die 110 as a cylindrical molding (parison).

As shown in FIG. 7, in the cylindrical die 110, the part where the melted resin joins together to be formed in a cylindrical shape is generally referred to as "weld". For example, when a cylindrical die 110 provided with a heart-shaped mandrel 130 is used, melted resin fed from the extruder 100 to the cylindrical die 110 flows downward from the inlet provided on the mandrel 130 for the resin flow paths 150 and is divided by the cylindrical side of the mandrel 130 to flow in the left and right directions. Since the right and left flow paths are shallower toward their ends, the melted resin gradually overflows from the flow paths and flows obliquely downward. Finally, the melted resin joins together at the opposite side to the part where the melted resin is divided. This part where the melted resin joins together is the weld 160. Even in a cylindrical die 110 provided with a double-heart shaped or spiral-shaped mandrel 130, melted resin fed from an extruder flows from the side of the mandrel to resin flow paths provided on the mandrel 130, in the same way. The tip of the resin flow joins at a part along the mandrel 130, which forms a weld 160.

CITATION LIST

Patent document 1: JP 06-328634 A
Patent document 2: JP 07-052333 A
Patent document 3: JP 55-121017 A
Patent document 4: JP 58-209562 A
Patent document 5: JP 2005-206806 A
Patent document 6: JP 2007-177208 A

DISCLOSURE OF THE INVENTION

The multilayer containers with EVOH layered as an interlayer disclosed in Patent documents 1 and 2 have a more excellent barrier property than conventional containers formed of a polyolefin and a polyester. Furthermore, the multilayer containers can control the barrier property by the thickness of the EVOH-laminated layer. Accordingly, the multilayer container having a desired barrier property can be easily produced.

However, those multilayer containers cannot be produced in manufacturing facilities for conventional single-layer containers. To produce a multilayer container in manufacturing facilities for conventional single-layer containers, at least two or more extruders are required to be added to extrude an adhesive resin and EVOH, respectively, and a special cylindrical die capable of forming a multilayer is required to be installed in the manufacturing facilities. Therefore, producing a multilayer container in manufacturing facilities for conventional single-layer containers increases economic burden.

Moreover, to recycle remaining material and purged material generated when the multilayer container is produced, an extruder for remaining material to extrude remaining material and purged material is needed. However, from the balance between the investment required to add an extruder for the recycle and the cost involved in the disposal of remaining material and purged material without the recycle, the latter may be selected in accordance with the shape of the multilayer container. This can cause environmental load.

According to the methods disclosed in Patent documents 3 to 6 including dispersing and layering a polyamide in the wall of the container, facilities for producing conventional single-layer containers can be used with little change, and dispersing and layering a polyamide resin to the composition can impart almost the same barrier property as that of the multilayer structure.

Moreover, since the resin materials forming a container is the same as those forming remaining material and purged material generated when the container is produced, so that remaining material and purged material can be pulverized with a pulverizer and mixed with pellets, fed to an extruder, and recycled as one of the materials forming the container. In particular, according to the methods disclosed in Patent documents 6 and 7 including using N-MXD6, the barrier resin itself has more excellent barrier property than nylon 6 so as to provide excellent barrier property.

However, a container with a polyamide dispersed and layered in the wall has a disadvantage that a polyamide hardly exists around a weld in the wall to cause the barrier property of the container to deteriorate. Furthermore, the amount of a polyamide decreases around the weld, compared with other parts, and thus the shrinkage rate difference is made in a mold during the molding process to cause a problem of the deformation of a container.

An objective of the present invention is to provide a method of manufacturing a direct-blow molded container with low cost, excellent barrier property, and no deformation.

The present invention provides the following method of manufacturing a direct-blow molded container.

A method of manufacturing a direct blow-molded container, the container containing 60 to 90% by mass of a polyolefin (A), 5 to 30% by mass of an acid-modified polyolefin (B), and 2 to 35% by mass of a metaxylylene group-containing polyamide (C), the metaxylylene group-containing polyamide (C) being dispersed and layered in the polyolefin (A), the method including: using a die provided with a die body having a flow hole in which the melted resin extruded from an extruder flows and a cylindrical hollow having an opening in the lower side and the flow hole in the upper side, the opening and the flow hole opening downward and upward, respectively, a mandrel having a tip in the upper side, the tip pointing to the opening of the tip of the flow hole, and a support part formed in a flow path clearance so that the flow path clearance formed between the hollow of the die body and the mandrel defining a resin flow path, the support part holding the mandrel in the hollow of the die body; setting the temperature of the die to fall within the range between the melt beginning temperature and the melt ending temperature of the metaxylylene group-containing polyamide (C), the melt beginning temperature and the melt ending temperature being measured with a differential scanning calorimeter; feeding melted resin formed by the extruder to the flow hole; forming the melted resin flowing through the flow hole in a cylindrical shape wrapping around the mandrel by the tip of the mandrel; passing the cylindrical melted resin through the support part in the flow path clearance to divide the cylindrical melted resin immediately before the support part; joining the divided resin immediately after the support part so as to form the joined melted resin in a cylindrical shape again; and extruding the cylindrical melted resin from the opening.

The direct-blow molded container manufactured by the method of the present invention is practical with no deformation, which has excellent barrier property against fuels, chemicals, various gases including oxygen.

PREFERRED MODE FOR CARRYING OUT THE INVENTION

Polyolefin (A)

Figure 1:
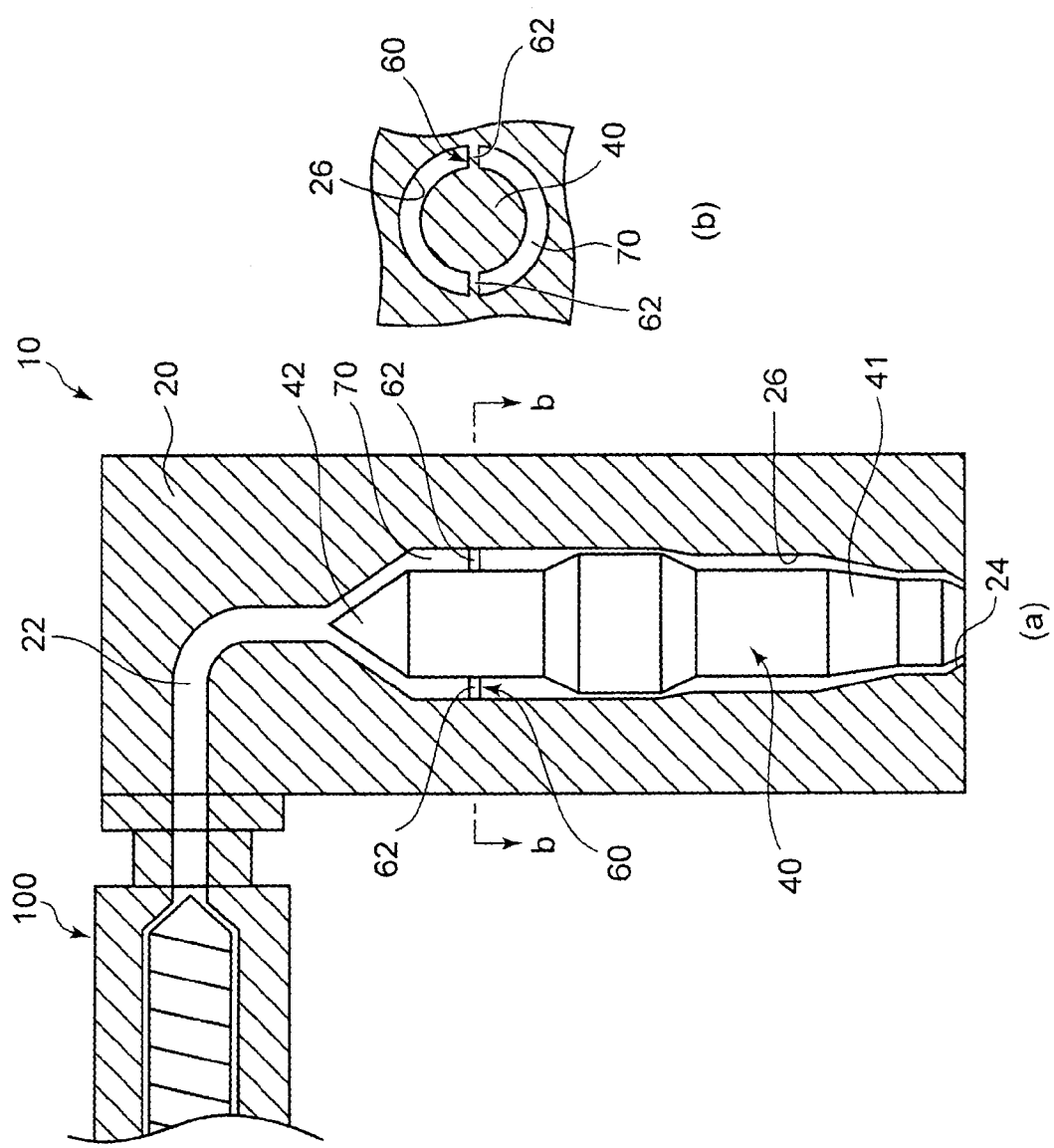
FIG. 1(a) shows the vertical sectional view of the area around the cylindrical die of an example of the direct blow device equipped with a cylindrical die used in the present invention.
FIG. 1(b) shows the horizontal sectional view along the line b-b in FIG. 1(a).

The polyolefin (A) used in the present invention is a main material forming a container. As the polyolefin (A), any polyolefins available for a direct-blow molded container can be used. For example, the polyolefin (A) includes various polyethylenes such as high density polyethylenes, medium density polyethylenes, linear low density polyethylenes, low density polyethylenes, and metallocene polyethylenes and various polypropylenes such as propylene homopolymers, ethylene-propylene block copolymers, and ethylene-propylene random copolymers.

Preferably, the melt viscosity and the molecular weight of the polyolefin (A) are appropriately selected from the viewpoint of preventing drawdown causing the uneven thickness of a molded article from occurring and from the viewpoint of increasing the strength of the structure itself.

The melt viscosity and the molecular weight of the polyolefin (A) are typically indicated by a melt flow rate (MFR).

The MFR is measured in accordance with the method described in JIS K7210. The MFRs of polyethylene and polypropylene are measured at 190° C. and 2.16 kgf and at 230° C. and 2.16 kg, respectively. The MFR preferably falls within the range of 0.1 to 2.5 (g/10 minutes), more preferably 0.15 to 2.0 (g/10 minutes), at 190° C. and 2.16 kgf), further more preferably 0.2 to 1.5 (g/10 minutes, at 190° C. and 2.16 kgf).

Generally, a metaxylylene group-containing polyamide has larger density than a polyolefin, and thus polyethylene blended with a metaxylylene group-containing polyamide is likely to increase the drawdown in the molding process, compared with polyethylene itself. The polyolefin (A) used in the present invention with a MFR of 0.1 to 2.5 can avoid drawdown in the molding process to increase too much so as to prevent the thickness accuracy of a molded article from deteriorating and also can improve the dispersion state of the metaxylylene group-containing polyamide (C).

In the polyolefin (A), additives such as an antioxidant, a matting agent, a heat-resistant stabilizer, a weathering stabilizer, an ultraviolet absorber, a nucleating agent, a plasticizer, a flame retarder, an antistatic agent, a color protector, and a lubricant can be added without detracting from the effect of the invention. Without being limited to these additives, various materials may be combined. Furthermore, for the purpose of improving the drawdown resistance and the strength against falling and shock, the environmental stress cracking resistance, and the like, one or more kinds of polyolefins other than the polyolefin (A) can be blended.

Acid-Modified Polyolefin (B)

The acid-modified polyolefin (B) used in the present invention can be a polyolefin grafting-modified with an unsaturated carboxylic acid or the anhydride thereof, which is widely used as an adhesive resin in general. In the present invention, the acid-modified polyolefin (B) plays a role in maintaining the strength of the structure by bonding the polyolefin (A) to the metaxylylene group-containing polyamide (C) dispersed in the polyolefin (A). The types of the acid-modified polyolefin (B) are preferably used depending on the types of the polyolefin (A). For example, when the polyolefin (A) is a polyethylene, a polyethylene graft-modified with unsaturated carboxylic acid or the anhydride thereof is preferably used. When the polyolefin (A) is a polypropylene, a polypropylene graft-modified with unsaturated carboxylic acid or the anhydride thereof is preferably used.

Specific examples of the unsaturated carboxylic acid or the anhydride thereof include acrylic acid, methacrylic acid, α-ethyl acrylic acid, maleic acid, fumaric acid, itaconic acid, citraconic acid, tetrahydro phthalic acid, chloro-maleic acid, butenyl-succinic acid, and the anhydrides thereof. In particular, maleic acid and maleic anhydride are preferably used. Various known methods of graft-copolymerizing the polyolefin with unsaturated carboxylic acid or the anhydride thereof is used to obtain an acid-modified polyolefin. For example, a polyolefin is melted with an extruder or the like, dissolved in a solvent, suspended in water, or the like, before a graft monomer is added in the polyolefin.

The MFR of the acid-modified polyolefin (B) used in the present invention is 1 to 10 times, preferably 1.5 to 9 times, more preferably 2 to 8 times that of the polyolefin (A). The MFR of the acid-modified polyolefin (B) of less than 1 time that of the polyolefin (A) is unpreferable because the metaxylylene group-containing polyamide (C) exists too much in a parison to possibly decrease the adhesive strength of the pinch-off of the structure as described below. The MFR of the acid-modified polyolefin (B) of more than 10 times that of the polyolefin (A) is also unpreferable because the metaxylene group-containing polyamide (C) may come out in the surface of the structure to cause the appearance and the barrier property to deteriorate.

The MFR of the acid-modified polyolefin (B) is preferably relatively high from the viewpoint of maintaining the molding process stability and the strength of the structure. The MFR of the acid-modified polyolefin (B) is measured in the same manner as that of the polyolefin (A) in accordance with the method described in JIS K7210, which is preferably 0.5 to 5 (g/10 minutes), more preferably 0.6 to 4 (g/10 minutes), further more preferably 0.7 to 3 (g/10 minutes).

In the acid-modified polyolefin (B), additives such as an antioxidant, a matting agent, a heat-resistant stabilizer, a weathering stabilizer, an ultraviolet absorber, a nucleating agent, a plasticizer, a flame retarder, an antistatic agent, a color protector, and a lubricant can be added without detracting from the effect of the invention. Without being limited to these additives, various materials may be combined.

Metaxylylene Group-Containing Polyamide (C)

The metaxylylene group-containing polyamide (C) used in the present invention imparts the effect of improving the barrier property of the structure. The diamine unit forming the metaxylylene group-containing polyamide (C) contains preferably 70 mol % or more, more preferably 80 mol % or more, further more preferably 90 mol % or more of a metaxylylene diamine unit, from the viewpoint of the gas barrier property.

Diamines other than metaxylylene diamine includes p-xylylenediamine, 1,3-bis(aminomethyl)cyclohexane, 1,4-bis(aminomethyl)cyclohexane, tetramethylenediamine hexamethylenediamine, nonanemethylenediamine, and 2-methyl-1,5-pentanediamine but are not limited thereto.

The dicarboxylic acid unit forming the metaxylylene group-containing polyamide (C) contains preferably 50 mol % or more, more preferably 60 mol % or more, further more preferably 70 mol % or more of an α,ω-aliphatic dicarboxylic acid from the viewpoint of the crystallinity.

The α,ω-aliphatic dicarboxylic acid includes suberic acid, adipic acid, azelaic acid, sebacic acid, and dodecanoic acid. From the gas property and the crystallinity, adipic acid and sebacic acid are preferably used.

Dicarboxylic acid units other than α,ω-aliphatic dicarboxylic acid units include alicyclic dicarboxylic acids such as 1,3-cyclohexanedicarboxylic acid and 1,4-cyclohexanedicarboxylic acid; aromatic dicarboxylic acids such as terephthalic acid, isophthalic acid, o-phthalic acid, xylylene dicarboxylic acid, and napthalenedicarboxylic acid but are not limited thereto.

Among these, isophthalic acid and 2,6-napthalenedicarboxylic acid are preferable because these acids can easily provide a polyamide with excellent gas barrier property without inhibiting polycondensation reaction during the generation of the metaxylylene group-containing polyamide (C). The content of isophthalic acid unit and 2,6-napthalenedicarboxylic acid is preferably 30 mol % or less, more preferably 20 mol % or less, further more preferably 15 mol % or less based on the dicarboxylic acid unit from the viewpoint of the dispersibility of the metaxylylene group-containing polyamide (C) and the barrier property of the structure.

Besides the diamine units and the dicarboxylic acid units, as a copolymerized unit forming the metaxylylene group-containing polyamide (C), lactams such as ε-caprolactam and laurolactam; aliphatic amino carboxylic acids such as aminocaproic acid and amino undecanic acid; and an aromatic amino carboxylic acid such as p-aminomethyl benzoic acid can be used without undermining the effect of the present invention.

The metaxylylene group-containing polyamide (C) is produced by melt condensation polymerization (melt polymerization). For example, a nylon salt composed of diamine and dicarboxylic acid is heated in the presence of water under increased pressure and then polymerized in the melt state while the added water and the condensation water are removed. Alternatively, the metaxylylene group-containing polyamide (C) is produced by directly adding diamine in melted dicarboxylic acid through condensation polymerization. In this case, to maintain the reaction system in a homogeneous liquid is continuously added in dicarboxylic acid, during which the mixture is heated without the temperature of the reaction system falling below the melting point of the oligoamide and the polyamide to be generated to promote the condensation polymerization.

In the condensation polymerization system for generating the metaxylylene group-containing polyamide (C), a phosphorus atom-containing compound may be added to achieve effects on the promotion of amidation reaction and on the prevention of coloring during the condensation polymerization.

The phosphorus atom-containing compound includes dimethylphosphinic acid, phenylmethyl phosphinic acid, hypophosphorous acid, sodium hypophosphite, potassium hypophosphite, lithium hypophosphite, ethyl hypophosphite, phenyl phosphonous acid, sodium phenyl phosphonite, potassium phenyl phosphonite, lithium phenyl phosphonite, ethyl phenyl phosphonite, phenylphosphonic acid, ethyl phosphonic acid, sodium phenyl phosphonate, potassium phenyl phosphonate, lithium phenyl phosphonate, diethyl phenyl phosphonate, sodium ethyl phosphonate, potassium ethyl phosphonate, phosphorous acid, sodium hydrogenphosphite, sodium phosphite, triethyl phosphite, triphenyl phosphite, and pyrophosphorous acid. Among these, particularly metal hypophosphites such as sodium hypophosphite, potassium hypophosphite, and lithium hypophosphite are preferably used due to high effects on the promotion of amidation reaction and on the prevention of coloring. In particular, sodium hypophosphite is preferable. However, the phosphorus atom-containing compound that can be used in the present invention is not limited to these compounds.

The additive amount of the phosphorus atom-containing compound added in the polycondensation system for generating the metaxylylene group-containing polyamide (C) is preferably 1 to 500 ppm, more preferably 5 to 450 ppm, further more preferably 10 to 400 ppm, equivalent to the concentration of phosphorus atoms in the metaxylylene group-containing polyamide (C) from the viewpoint of color protection of the metaxylylene group-containing polyamide (C) during the polycondensation.

In the polycondensation system for generating the metaxylylene group-containing polyamide, an alkali metal compound or an alkaline earth metal compound is preferably used together with the phosphorus atom-containing compound. To prevent the metaxylylene group-containing polyamide from being colored during the polycondensation, a phosphorus atom-containing compound should be present in sufficient amount. However, in order to adjust the reaction rate of the amidation, an alkali metal compound or an alkaline earth metal compound preferably coexists with the phosphorus atom-containing compound.

Such metal compounds include, for example, alkali metal/alkaline earth metal hydroxides such as lithium hydroxide, sodium hydroxide, potassium hydroxide, rubidium hydroxide, cesium hydroxide, magnesium hydroxide, calcium hydroxide, and barium hydroxide; and alkali metal/alkaline earth metal acetates such as lithium acetate, sodium acetate, potassium acetate, rubidium acetate, cesium acetate, magnesium acetate, calcium acetate, and barium acetate but can be used without being limited to these compounds.

When an alkali metal compound or an alkaline earth metal compound is added in the condensation polymerization system for generating the metaxylylene group-containing polyamide (C), the value determined by dividing the mole number of the compound by that of the phosphorus atom-containing compound is preferably 0.5 to 2.0, more preferably 0.6 to 1.8, further more preferably 0.7 to 1.5. Setting the additive amount of an alkali metal compound or an alkaline earth metal compound to within the above-mentioned range can achieve the effect on the promotion of amidation reaction from the phosphorus atom-containing compound and can suppress the generation of gel.

After derived and pelletized, the metaxylylene group-containing polyamide (C) obtained by the melt condensation polymerization may be dried for use or may be subjected to solid phase polymerization to further improve the polymerization degree. As a heater used for the drying or the solid phase polymerization, a continuous heated-air dryer; rotating drum heaters such as a tumble dryer, a conical dryer, and a rotary dryer; and a conical heater internally provided with a rotor blade called a nauta mixer can be suitably used. However, well-known methods and devices can be used without being limited to these heaters. In particular, when a polyamide is subjected to solid phase polymerization, a rotating drum heater among the above-mentioned devices is preferably used because this heater can seal the system and easily promote the condensation polymerization without the presence of oxygen that causes the coloring.

There are some indices of the polymerization degree of the metaxylylene group-containing polyamide, but relative viscosity is generally used. The relative viscosity of the metaxylylene group-containing polyamide (C) used in the present invention is preferably 2.5 to 4.5, more preferably 2.6 to 4.2, further more preferably 2.7 to 4.0. Setting the relative viscosity of the xylylene group-containing polyamide (C) to fall within the above-mentioned range can stabilize the molding process and can provide a structure with the xylylene group-containing polyamide (C) being dispersed and layered and with excellent appearance.

In the present invention, to increase the adhesive strength of the pinch-off, the physical properties of each material are specified, and the amount of the metaxylylene group-containing polyamide (C) in a parison is reduced. As a result, the structure easily has a part with a high concentration of the metaxylylene group-containing polyamide, compared with a conventional one. Therefore, the relative viscosity of less than 2.5 is unpreferable because the strength of the structure is likely to easily decrease, compared with the conventional technology. The relative viscosity of more than 4.5 is also unpreferable because the dispersion state of the metaxylylene group-containing polyamide (C) is unlikely to be controlled so as to unstabilize the formability.

The relative viscosity is herein referred to as the ratio of the free-fall time t of 1 g of polyamide dissolved in 100 mL of 96% sulfuric acid to the free-fall time t0 of 96% sulfuric acid, which is represented by the following expression. The free-fall times t0 and t are measured at 25° C. with a Cannon-Fenske viscometer.

$$\text{Relative viscosity} = t/t0 \qquad (a)$$

The metaxylylene group-containing polyamide (C) used in the present invention contains the component with a number average molecular weight of 1000 or less measured by GPC in preferably 2% by mass or less, more preferably 1.5% by mass or less, furthermore preferably 1% by mass or less from the viewpoint of the appearance and the barrier property of the structure. To obtain such a metaxylylene group-containing polyamide (C), oligomers are preferably removed by hot-water washing, vacuum drying, or solid phase polymerization after the melt polycondensation.

In the metaxylylene group-containing polyamide (C), additives such as an antioxidant, a delusterant, a heat-resistant stabilizer, a weathering stabilizer, an ultraviolet absorber, a nucleating agent, a plasticizer, a fire retardant, an antistatic agent, a color protector, a lubricant, and an antigelling agent; clay such as laminar silicate; and a nano filler can be added without undermining the effect of the present invention. To modify the metaxylylene group-containing polyamide (C), various polyamides such as nylon 6, nylon 66, and a non-crystalline nylon generated from an aromatic dicarboxylic acid monomer, and the modified resin of these polyamides; a polyolefin and the modified resin thereof; an elastomer with a styrene structure; and the like can be added as needed. However, materials to be added for this modification are not limited to these compounds, and various materials may be combined.

Mixing Ratio of Materials

The mixing ratio of materials forming the structure of the present invention is 60 to 90% by mass of the polyolefin (A), 5 to 30% by mass of the acid-modified polyolefin (B), and 2 to 35% by mass of the metaxylylene group-containing polyamide (C). Preferably, the mixing ratio is 65 to 90% by mass of the polyolefin (A), 5 to 25% by mass of the acid-modified polyolefin (B), and 5 to 30% by mass of the metaxylylene group-containing polyamide (C). More preferably, the mixing ratio is 70 to 90% by mass of the polyolefin (A), 5 to 20% by mass of the acid-modified polyolefin (B), and 5 to 25% by mass of the metaxylylene group-containing polyamide (C). However, the total of three components of (A) to (C) does not exceed 100% by mass. Setting the mixing ratio of materials to fall within the above-mentioned range can efficiently enhance the barrier property of the structure and minimize the decrease in the strength of the structure.

Other Resins

In addition to the above-mentioned materials, for example, homopolymers of α-olefins with 3 to 20 carbon atoms such as polybutene-1 and polymethylpentene; copolymers of α-olefins with 3 to 20 carbon atoms; copolymers of α-olefins with 3 to 20 carbon atoms and cyclic olefins with 3 to 20 carbon atoms; ionomers; various modified polyethylenes such as ethylene-ethyl acrylate copolymers and ethylene-methylacrylate copolymers; polystyrenes; various polyesters such as polyethylene terephthalates; various polyamides such as nylon 6 and nylon 66; styrene-butadiene copolymers and hydrogenated styrene-butadiene copolymers; various thermoplastic elastomers, and the like can be added without undermining the effect of the present invention. Various materials can be combined without limited to these materials.

Method of Manufacturing Direct Blow-Molded Container

The direct-blow molded container obtained by the method of the present invention is a molded article having a shape of a bottle, a tube, or the like, which stores and preserves objects. The molded article of the present invention can be formed by a general direct blow molding except for setting the temperature of the die within a specific range. For example, with a molding device provided with an extruder, an adaptor, a cylindrical die, a mold clamping device, a mold, a cooling device, and the like, the polyolefin (A), the acid-modified polyolefin (B), the metaxylylene group-containing polyamide (C), and optionally the blending material obtained by dry-blending a pulverized molded article are fed to the extruder and then melt and mixed. The melt and mixed material were extruded in a cylindrical shape (sometimes referred to as "parison") through the adaptor and the cylindrical die. At the timing when extruded in a suitable length, the extruded parison is tightly press with the mold, and then air is fed to inflate the parison and bring the parison into contact with the cooled mold. After left to be cooled, the mold is opened to eject a molded container.

Conventional extruders can be applied when the direct-blow molded container of the present invention is produced. However, a single shaft extruder is preferably used because it can conduct moderate kneading and stable extrusion even under high pressure with resin. The screw of the single shaft extruder is typically composed of three parts: a feeder for conveying raw materials to the tip of the extruder, a compressing part for completely melting a resin softened by absorbing heat, and a measuring part for controlling the extrusion amount. In the present invention, general screws can be used without limitation. However, the screw generally referred to as "full flight screw" without a kneading part, such as a Dulmadge type screw or a Maddock type screw is preferably used from the viewpoint of preventing the metaxylylene group-containing polyamide (C) from being excessively dispersed.

To easily control the dispersion state of the metaxylylene group-containing polyamide (C), a rapid compression screw with a relatively short compressing part is preferably used. The full flight screw of a rapid compression type is preferably provided with the feeder of 40 to 60, the compressing part of 5 to 20, and the measuring part of 30 to 50 based on 100 representing the number of the pitches of the entire screw. (One pitch corresponds to the one rotation of the flight.) More preferably, the full flight screw is provided with the feeder of 45 to 55, the compressing part of 10 to 15, and the measuring part of 35 to 45 based on 100 representing the number of the pitches of the entire screw. The distance between pitches may be arbitrary. A so-called double flight screw with the number of a part of flights of two can also be used.

To maintain the state of the metaxylylene group-containing polyamide (C) dispersed and layered by the shear of the screw, the breaker plate usually provided in the extruder head is preferably not provided. The metaxylylene group-containing polyamide (C) dispersed and layered in the extruder may be cut and minutely dispersed by pores in the breaker plate.

In the general behavior of a small amount of resin dispersed in a large amount of resin in an extruder, the entire resin softens by heat received from the heater in the extruder. Then, the entire resin is melted by receiving shear stress by screw rotation. The small amount of resin is drawn out by the shear stress. When further receiving the shear stress, the drawn-out resin is cut (dispersed), layered and then uniformly scattered (distributed) to the whole. This behavior is repeated to uniformly knead the small amount of resin into a large amount of resin.

In the resin structure of the present invention, to effectively improve the barrier property, the metaxylylene group-containing polyamide (C) is required to be dispersed and layered. Thus, the resin is required to be extruded from the tip of the extruder when resin pellets are drawn out and layered by shear stress in the above-mentioned extruder. The method of achieving this mainly includes reducing the screw rotation or optimizing the setting temperature of the extruder. The screw rotation seems to be easily reduced. However, this may cause the production efficiency to decrease and may decrease the strength of a container due to the parison atmospherically-exposed for a long time. Thus, reducing the screw rotation may be applied with limitation. In this case, the temperature of the resin in an extruder is preferably controlled. Specifically, the temperature of the extruder is adjusted so that the temperature of the resin when the materials are melted and mixed in the extruder falls within the range of the melting point of the metaxylylene group-containing polyamide (C), preferably ±20° C., more preferably ±15° C., further more preferably ±10° C. The temperature of the resin is preferably adopts the measured real temperature of the resin actually extruded from the tip of the extruder. However, when the difference between the numerical value measured with a thermocouple provided at the tip of the extruder and the real temperature of the resin turns out to some degree, the temperature of the resin may be adjusted by reference to the numerical value. The melting and mixing are preferably conducted at the temperature of the resin not falling below the melting point of the metaxylylene group-containing polyamide (C) −20° C. to sufficiently soften the metaxylylene group-containing polyamide (C). This can hardly mix unmelted pellets in the molded article and can burden the extruder motor not too much. The melting and mixing are preferably conducted at the temperature of the resin not falling above the melting point of the metaxylylene group-containing polyamide (C) +20° C. to incompletely melt the metaxylylene group-containing polyamide (C). This disperses the metaxylylene group-containing polyamide (C) by shear stress by screw rotation not too much and maintains the dispersion state of the layer in the resin composition. Thus, the metaxylylene group-containing polyamide (C) is hardly microparticulated. As a result, the barrier property of the container is avoided from decreasing too much.

In the melted resin flowing from the extruder to the cylindrical die, the metaxylylene group-containing polyamide (C) is already dispersed and layered in the polyolefin (A). The metaxylylene group-containing polyamide (C) hardly exists in the surface of the melted resin when flowing from the extruder to the cylindrical die but in the polyolefin (A).

As shown in FIG. 1, the cylindrical die 10 of one example of the die according to the present invention is provided with a die body 20, a mandrel 40, and a support part 60.

The die body 20 has a flow hole 22 through which the melted resin extruded from the extruder 100 flows and a cylindrical hollow 26 with an opening 24 in the lower side. The flow hole 22 opens in the upper side of the hollow 26.

The mandrel 40 has a cylinder part 41, the center of which has a large diameter, and a tip 42 provided in the upper side of the cylinder part. The mandrel 40 is disposed in the hollow 26 so that the tip 42 points to the opening of the tip of the flow hole 22.

Figure 2:
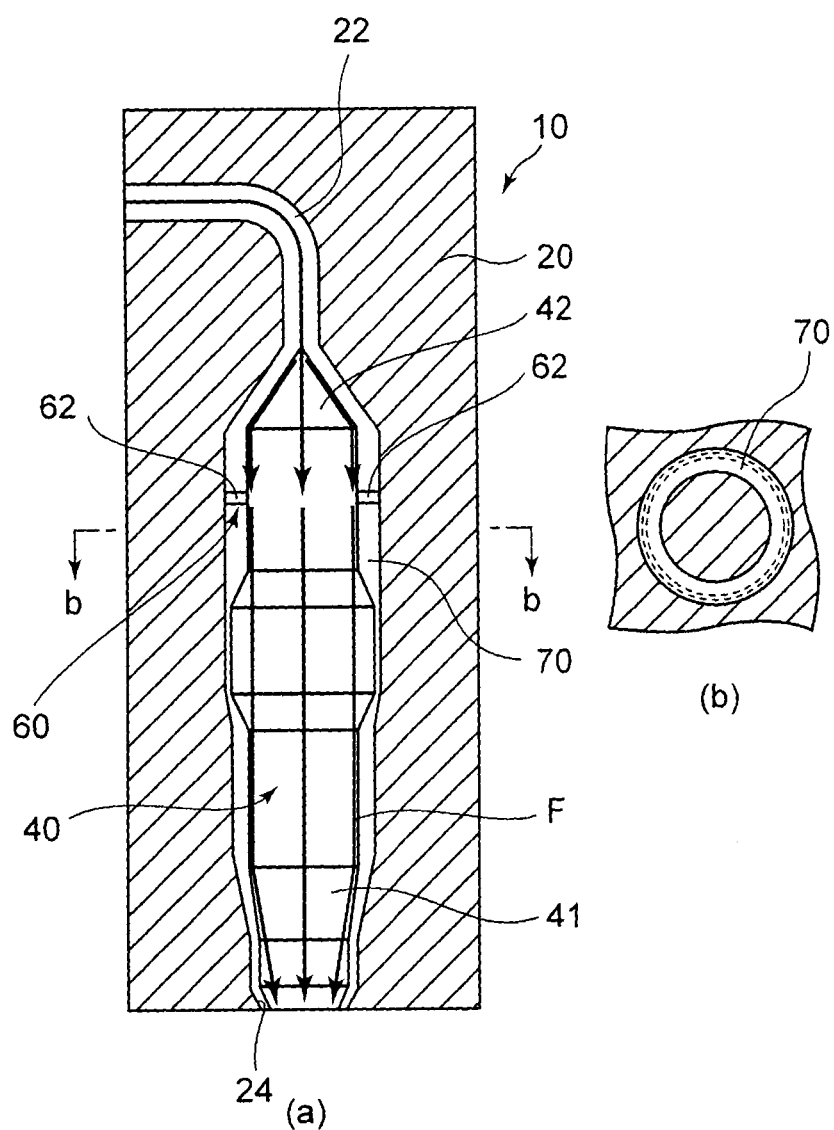
FIG. 2(a) shows the pattern diagram in the vertical sectional view along the flow direction of a melted resin in the cylindrical die shown in FIG. 1(a).
FIG. 2(b) shows the pattern diagram illustrating an example of the dispersion state of the metaxylylene group-containing polyamide (C) in the horizontal sectional view along the line b-b in FIG. 2(a).

The support part 60 holds the mandrel 40 in the hollow 26 of the die body 20 so that a flow path clearance 70 formed between the hollow 26 of the die body 20 and the mandrel 40 defines a resin flow path F (see FIG. 2). The support part 60 is formed in the flow path clearance 70. The flow path clearance 70 may have any shapes. In the example shown in FIG. 1, the cylinder part 41 has a center with a large diameter, which is a flow path with a diameter in the downstream side being smaller than that at the support part 60. This applies pressure so that the cylindrically-divided resin passing through this narrow part has a uniform parison thickness.

The support part 60 has a plurality of rod-shaped supports 62. (The support part 60 may have a plurality of plate-shaped supports.) The plurality of supports 62 are radially disposed around the mandrel 40 in the flow path clearance 70.

As shown in FIG. 2, the method of manufacturing a direct-blow molded container with a device having the cylindrical die 10 for manufacturing a direct-blow molded container is generally described below. First, the melted resin formed by the extruder 100 is fed to the flow hole 22. Then, the melted resin flowing through the flow hole 22 is formed in a cylindrical shape wrapping around the mandrel 40 by the tip 42 of the mandrel 40. Subsequently, the cylindrical melted resin passes through the support part 60 in the flow path clearance 70 to divide the cylindrical melted resin immediately before the support part 60 and then join the divided resin immediately after the support part 60. In the flow path clearance 70, the diameter of which in the downstream side is smaller than that at the support part 60, the joined melted resin is received pressure so that the cylindrically-divided resin passing through this narrow part has a uniform parison thickness. Then, the joined melted resin is formed in a cylindrical shape again. After the cylindrically-formed resin flows from the opening 24, a direct-blow molded container is produced.

Figure 7:
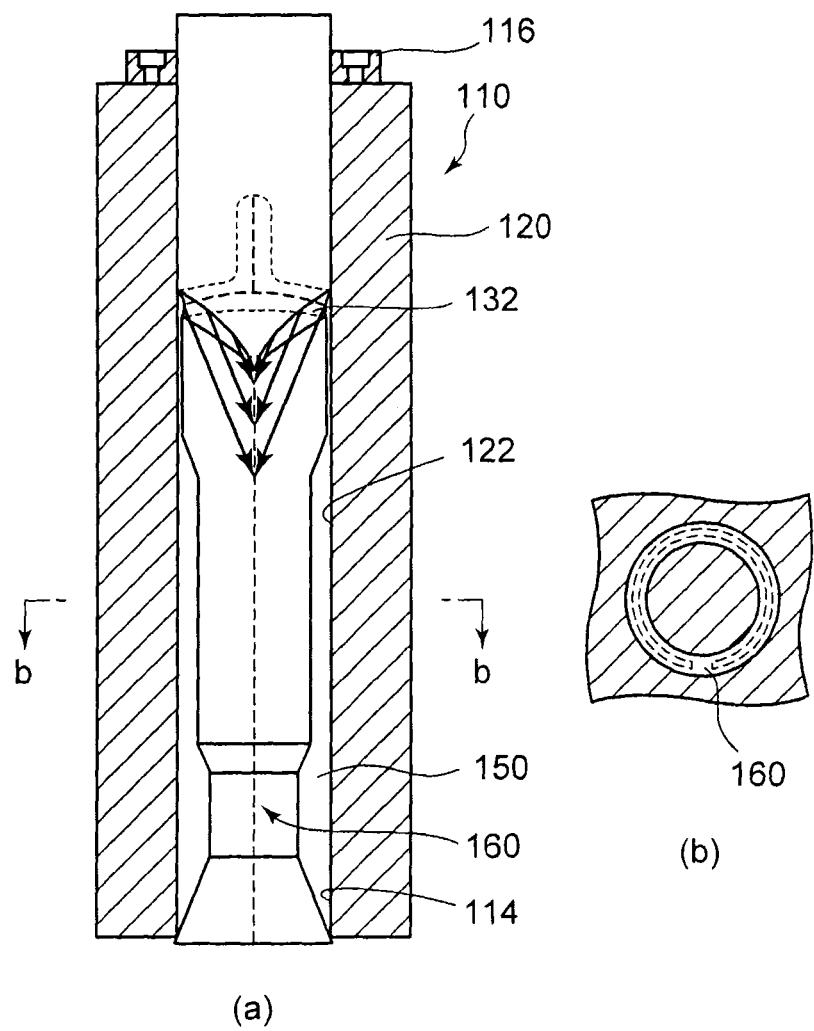
FIG. 7(a) shows the pattern diagram in the vertical sectional view along the flow direction of a melted resin in the cylindrical die shown in FIG. 5.
FIG. 7(b) shows the pattern diagram illustrating an example of the dispersion state of the metaxylylene group-containing polyamide (C) in the horizontal sectional view along the line b-b in FIG. 7(a).

The method of the present invention is compared with a conventional method. When a cylindrical die provided with the above-mentioned heart-shaped mandrel is used in a conventional method, the metaxylylene group-containing polyamide (C) hardly exists around the weld as shown in FIG. 7(b). As mentioned above, the metaxylylene group-containing polyamide (C) hardly exists in the surface of the melted resin but in the polyolefin (A). The surface of the melted resin joins in the part where the melted resin joins (around the weld). As a result, the metaxylylene group-containing polyamide (C) does not exist in the part where the melted resin joins. Such a weld existing in the wall of a container causes the barrier property to decrease. Furthermore, in the resin composition, the concentration of the metaxylylene group-containing polyamide (C) decreases around the weld compared with other parts. This causes the difference in the shrinkage rate when the resin cools in the mold to deform the container.

On the other hand, when such a direct-blow molded container is formed by the method of the present invention, the melted resin conically expands from the mandrel 42 and cylindrically flows downward in the flow path clearance 70. Unlike in the case of using a cylindrical die provided with a heart-shaped mandrel, the part where the tip of the resin joins (weld) is never caused. In the method of the present invention, the tip of the melted resin first joins at the part where the melted resin is extruded from the cylindrical die as a parison and tightly pressed by a mold. This part is generally referred to as "pinch-off." However, since the pinch-off is formed by crushing and compression-bonding the parison with a mold, it is actually observed that the cross section of the pinch-off has no part where the metaxylylene group-containing polyamide (C) does not exist.

In a cylindrical die with such a structure, the outlet of the flow hole 22 that is the flow path of the resin flowing from the extruder is required to be provided above the tip 42 of the mandrel 40, so that the tip 42 of the mandrel 40 cannot be fixed to the upper part of the cylindrical die 10. Accordingly, a plurality of supports 62 holding the mandrel 40 are provided in the hollow 26 of the die body 20 and fix the mandrel 40 in the hollow 26 of the die body 20. The melted resin flowing from above the mandrel 40 flows in the flow path clearance 70 while maintained in a cylindrical shape formed by the tip 42. However, the melted resin maintained in a cylindrical shape is cut by the plurality of supports 62 when passing through the supports 62. After passing through the supports 62, the melted resin joins again. Accordingly, these supports 62 form a weld in a container formed by the cylindrical die 10 used in the present invention. However, as shown in FIG. 2, the weld formed by the supports 62 is not formed by joining the tip of the melted resin flow. Thus, the metaxylylene group-containing polyamide (C) exists in the weld of a container formed in this way, and the weld has little difference in the concentration of the metaxylylene group-containing polyamide (C) from the parts other than the weld. As a result, the weld has difference in the shrinkage rate from other parts not to deform a container.

Figure 4:
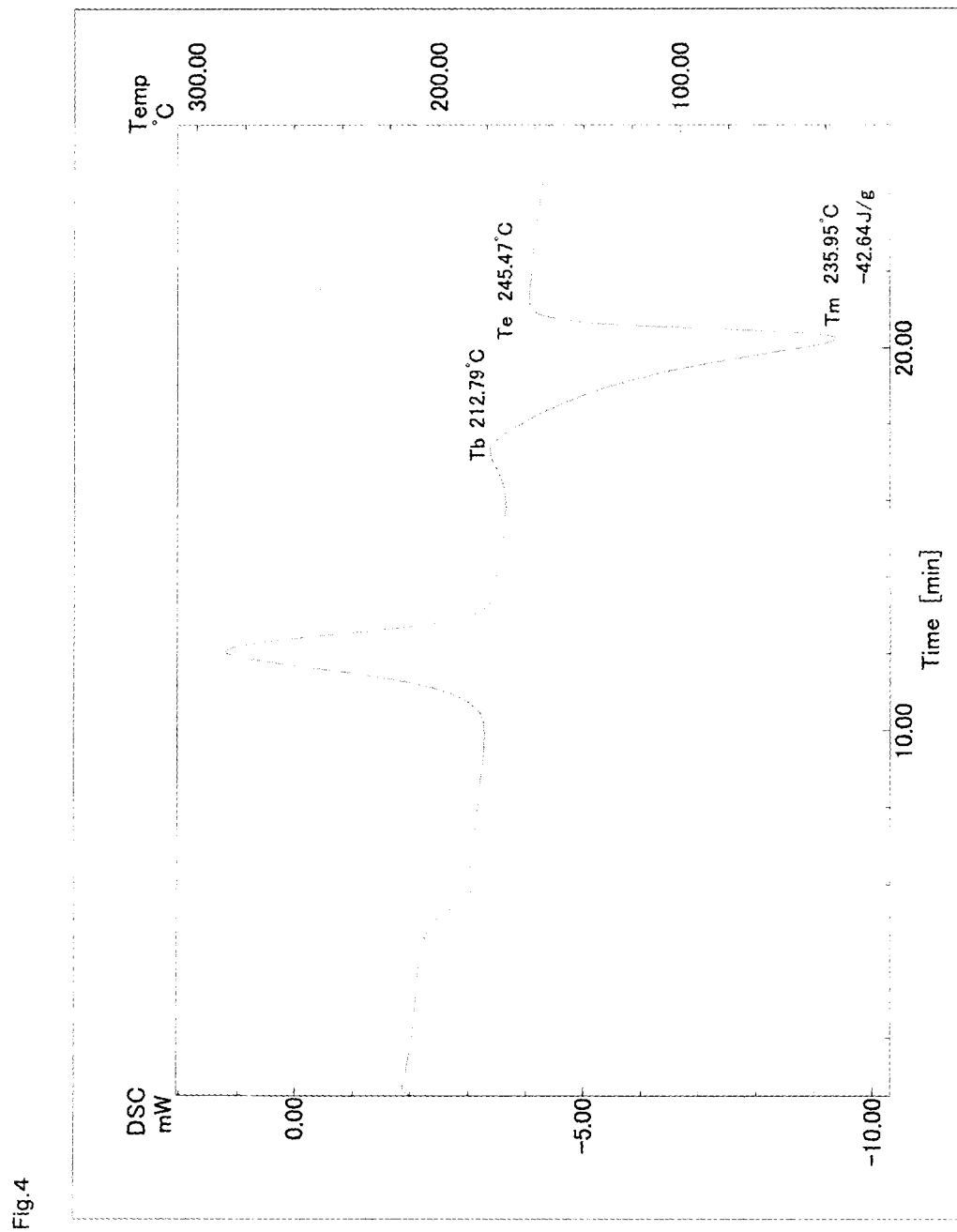
FIG. 4 shows a graph for illustrating the temperature setting of the cylindrical die.

In the method of the present invention, the temperature of the cylindrical die 10 is set to fall within the range preferably between the melt beginning temperature Tb and the melt ending temperature Te, more preferably between the melt beginning temperature Tb+3° C. and the melt ending temperature Te−3° C., further more preferably the melt beginning temperature Tb+5° C. and the melt ending temperature Te−5° C. of the metaxylylene group-containing polyamide (C). The melt beginning temperature Tb and the melt ending temperature Te are measured with a differential scanning calorimeter (DSC). A measurement sample is melted under the nitrogen gas stream by heating from room temperature to 300° C. at the rate of temperature increase of 10° C./minute and quenched by using liquid nitrogen. Then, the sample is measured at from room temperature to 300° C. and at the rate of temperature increase of 10° C./minute again. At this time, the beginning temperature and the ending temperature of the melting peak are observed (see FIG. 4).

Setting the temperature of the cylindrical die 10 lower than the melt beginning temperature Tb is unpreferable because the metaxylylene group-containing polyamide (C) solidifies to lose the flowability in the flow path clearance 70 of the cylindrical die 10. This hardly extrudes the resin from the flow path clearance 70 of the cylindrical die 10 to cause the pressure of the head of the extruder 100 to increase, resulting in unstable formability. Setting the temperature of the cylindrical die 10 higher than the melt ending temperature Te is unpreferable because the metaxylylene group-containing polyamide (C) dispersed and layered in the extruder 100 easily flows and further disperses in the flow path clearance 70 of the cylindrical die 10. This decrease the metaxylylene group-containing polyamide (C) layered in a molded article to cause the particles of the metaxylylene group-containing polyamide (C) to increase, resulting in the possible decrease in the barrier property of a container.

Figure 3:
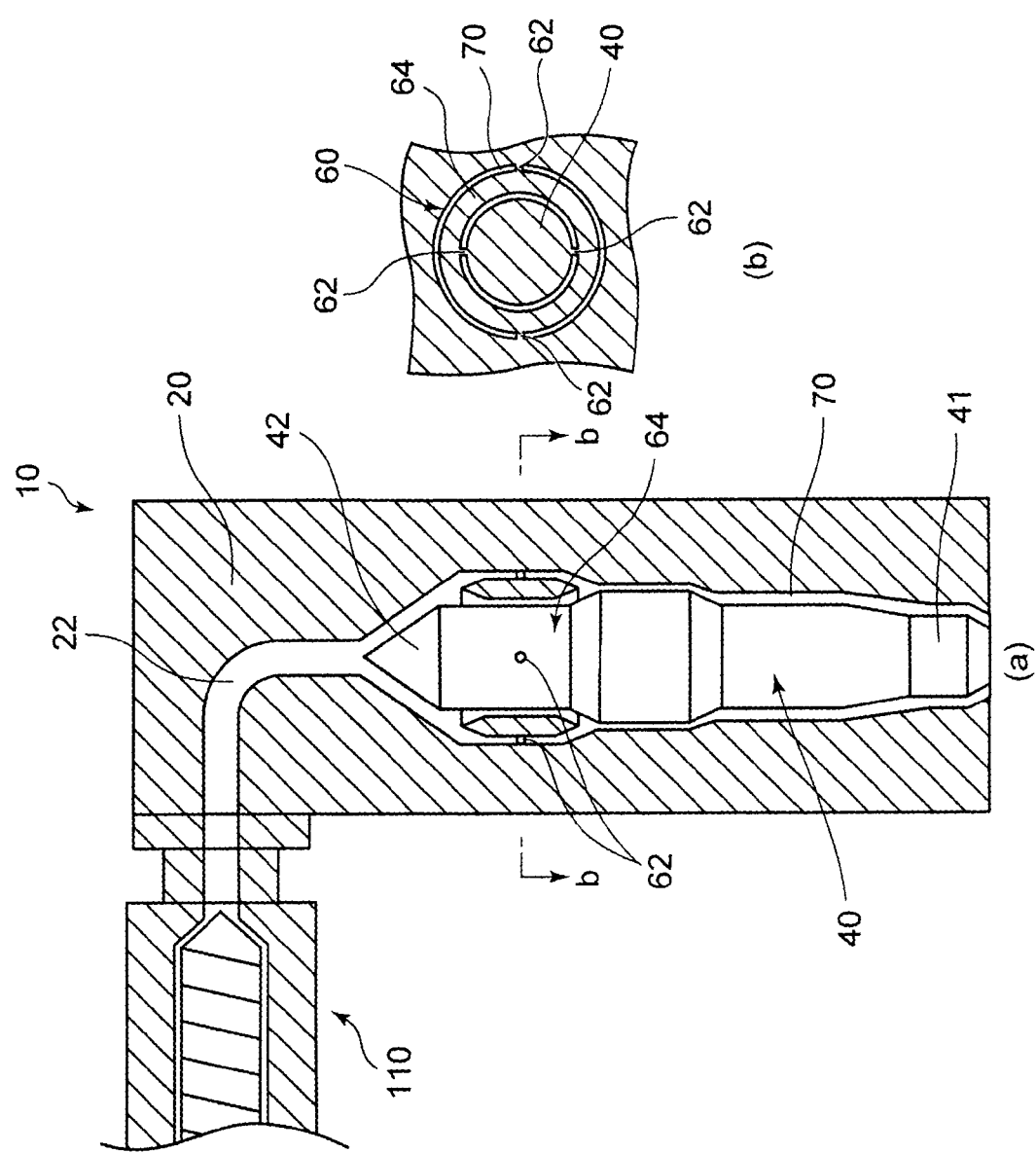
FIG. 3(a) shows the vertical sectional view of the area around the cylindrical die of an example of the direct blow device equipped with another cylindrical die used in the present invention.
FIG. 3(b) shows the horizontal sectional view along the line b-b in FIG. 3(a).

As shown in FIG. 3, in the present invention, the support part 60 has a ring 64 in the flow path clearance 70. This ring 64 is an enclosed support with a shape of a ring or cylinder, which wraps around the mandrel.

Among the plurality of supports 62, a predetermined number of supports 62 formed in the die body 20 hold the external side of the ring 64, and a predetermined number of the supports 62 formed in the mandrel 40 hold the internal side of the ring 64.

More specifically, a ring 64 is provided in the upper side of the cylinder part 41 of the mandrel 40. The some supports 62 fix the die body 20 and the ring 64, and other supports 62 fix the ring 64 and the mandrel 40. The former supports 62 and the latter supports 62 are displaced in the circumferential direction of the mandrel 40. This allows the cylindrical die 10 to produce a container where no weld penetrates through the wall of a container.

This structure cuts resin flowing from the extruder by not only the supports but also the ring. However, the tip of the melted resin flow does not join. Accordingly, the metaxylylene group-containing polyamide (C) exists in all the cut parts so as not to decrease the barrier property or deform a container. Generally, a weld is likely to decrease the strength of a container. However, the use of this cylindrical die allows no weld to penetrate through the wall of a container to obtain a container with excellent strength.

When the mandrel 40 is fixed by the supports 62 in the hollow 26 of the die body 20 as described above, the number of the supports 62 are preferably 2 to 6, more preferably 2 to 4. When the ring 64 is provided in the upper part of the cylinder part 41 of the mandrel 40, the numbers of the supports 62 between the die body 20 and the ring 64 and between the ring 64 and mandrel 40 are preferably 2 to 6, more preferably 2 to 4, respectively. One support is unpreferable because it cannot fix the mandrel 40 at a sufficient strength. Seven or more supports are also unpreferable because they cause too many welds to deteriorate the strength of a container and microcut the dispersed and layered metaxylylene group-containing polyamide (C). The supports 62 preferably have a small thickness and a small size as much as possible in the circumferential direction of the mandrel 40 but preferably are designed in consideration of the strength.

A container obtained by the method of the present invention can have various shapes such as a bottle, a cup, a tray, a tank, a tube, and a pipe. Compared with a conventional container, the container can effectively prevent the penetration of various objects including fuels such as gasoline, kerosene, and gas oil, lubricants such as engine oil and brake oil, various sanitary articles such as bleach, detergent, and shampoo, chemical substances such as ethanol and oxydol, various beverages such as vegetable juice and milk beverage, and seasonings. The component contained in such objects and thus can effectively used to enhance the storage stability of the stored object.

EXAMPLES

The present invention will be explained in more detail with reference to the examples. The various evaluations of the examples were conducted by the following methods.
(1) MFR of Polyolefin and Acid-Modified Polyolefin (g/10 Minutes)

The MFRs of a polyolefin and an acid-modified polyolefin were measured in accordance with the method described in JIS K7210 with a meltindexer available from Toyo Seiki Seisaku-Sho, Ltd. The MFRs of a polyethylene and an acid-modified polyethylene were measured at 190° C. and 2.16 kgf. The MFRs of a polypropylene and an acid-modified polypropylene were measured at 230° C. and 2.16 kg.
(2) Density of Polyolefin and Acid-Modified Polyolefin $(g/Cm^3)$ The single-layer sheet with a thickness of about 1 mm was formed with a sheet forming device equipped with an extruder, a T-slot die, the cooling roll, a puller, and the like. Then, the test piece of 50 mm×50 mm was cut out from the sheet to determine the true specific gravity with a true specific gravity meter.
(3) Relative Viscosity of Metaxylylene Group-Containing Polyamide 1 g of a metaxylylene group-containing polyamide was precisely weighed and then dissolved in 100 mL of 96% of sulfuric acid at 20 to 30° C. with being stirred. After dissolved completely, 5 mL of the solution was promptly set in a Cannon-Fenske viscometer and left in a thermostatic chamber at 25° C. for 10 minutes, and then the free-fall time t was measured. The free-fall time t0 of 96% of sulfuric acid only was measured under the same condition. The relative viscosity was calculated from the free-fall times t and t0 by the above-mentioned expression (a).
(4) Differential Scanning Calorimetry (DSC) of Metaxylylene Group-Containing Polyamide The melt beginning temperature Tb and the melt ending temperature Te were measured with a differential scanning calorimeter (brand name: DSC-60 available from Shimadzu Corporation). A sample was melted under the nitrogen gas stream by heating from room temperature to 300° C. at the rate of temperature increase of 10° C./minute and quenched by using liquid nitrogen. Then, the sample was measured at from room temperature to 300° C. and at the rate of temperature increase of 10° C./minute again. Then, the beginning temperature Tb and the ending temperature Te were read from the obtained chart.

(5) Dispersion State of Metaxylylene Group-Containing Polyamide in Weld

The center of the body of a formed bottle was cut, the cut surface was smoothed with a cutter, and then dilute iodine tincture (available from Tsukishima yakuhin) was applied to the cut surface to stain the metaxylylene group-containing polyamide. The dispersed state of the metaxylylene group-containing polyamide in the resin composition in the weld was examined through the magnifying glass of a stereomicroscope.

(6) Dimension of Container

Ten bottles were randomly selected. Subsequently, the diameter of the center of the body of each of the bottles was measured with a caliper in two directions: the pinch-off direction at the bottom and the pinch-off vertical direction. Then, the average of the diameters was calculated.

(7) Oxygen Barrier Property

A small amount of water was encapsulated in a bottle to measure the oxygen barrier property at 23° C. under the atmosphere of the relative humidity of 50% with an oxygen transmission rate measurement system (model: OX-TRAM 2/21 available from MOCON).

(8) Mass Reduction Rate of Methyl Ethyl Ketone

Ten bottles were randomly selected, filled with 380 mL of methyl ethyl ketone, and then capped. After measuring the total mass, each of the bottles was preserved in a room at 23° C. and 50% RH for one month. Subsequently, the total mass is measured again to determine the mass reduction rate of methyl ethyl ketone and then calculate the mass reduction rate.

Polyolefin

HDPE-1: brand name: NOVATEC HD HB420R, available from Japan Polyethylene Corporation, MFR=0.2, density=0.956

HDPE-2: brand name: NOVATEC HD HB322R, available from Japan Polyethylene Corporation, MFR=0.3, density=0.952

LDPE-1: brand name: NOVATEC LD ZE41K, available from Japan Polyethylene Corporation, MFR=0.5, density=0.922

PP-1: brand name: NOVATEC PP EC9, available from Japan Polypropylene Corporation, MFR=0.5, density=0.9

Acid-Modified Olefine (AD)

ADPE-1: brand name: Adtex L6100M, available from Japan Polyethylene Corporation, MFR=1.1, density=0.93

ADPE-2: brand name: ADMER NF518, available from Mitsui Chemicals, Inc., MFR=2.4, density=0.91

ADPP-1: brand name: MODIC P502, available from Mitsubishi Chemical Corporation, MFR=1.3, density=0.89

Metaxylylene Group-Containing Polyamide (PA)

PA-1: brand name: MX nylon S6121 available from Mitsubishi Gas Chemical Company, Inc., relative viscosity=3.5, melt beginning temperature (Tb)=212.8° C., melt ending temperature (Te)=245.5° C.

PA-2: brand name: MX nylon 57007 available from Mitsubishi Gas Chemical Company, Inc., relative viscosity=2.6, melt beginning temperature (Tb)=205.3° C., melt ending temperature (Te)=239.2° C.

Example 1

A device for forming a single-layer direct-blow molded container, which is equipped with a 55 mm single shaft extruder, a cylindrical die with the structure of FIG. 1, a mold, a mold clamping device, a cooler, and the like, was used. In the extrusion hopper, dry blend pellets of HDPE-1/ADPE-1/PA-1=85/10/5 (% by mass) were fed. The temperatures of the extruder cylinder, the adaptor, and the die were set to 210 to 235° C., 235° C., and 230° C., respectively. Subsequently, a parison was extruded at a screw rotation speed of 20 rpm. Then, a 400 mL columnar screw-capped bottle with a wall thickness of about 1 mm at the body was formed by direct blow molding.

Example 2

Except for the mixing ratio rate of HDPE-1/ADPE-1/PA-1=80/10/10 (% by mass), a bottle was formed in the same manner as Example 1.

Example 3

Except for the mixing ratio rate of HDPE-1/LDPE-1/ADPE-1/PA-1=70/10/10/10 (% by mass), a bottle was formed in the same manner as Example 1.

Example 4

Except for the mixing ratio rate of HDPE-1/ADPE-1/PA-1=65/20/15 (% by mass), a bottle was formed in the same manner as Example 1.

Example 5

A device for forming a single-layer direct-blow molded container, which is equipped with a 55 mm single shaft extruder, a cylindrical die with the structure of FIG. 1, a mold, a mold clamping device, a cooler, and the like, was used. In the extrusion hopper, dry blend pellets of HDPE-2/ADPE-2/PA-2=80/10/10 (% by mass) were fed. The temperatures of the extruder cylinder, the adaptor, and the die were set to 200 to 225° C., 225° C., and 225° C., respectively. Subsequently, a parison was extruded at a screw rotation speed of 20 rpm. Then, a 400 mL columnar screw-capped bottle with a wall thickness of about 1 mm at the body was formed by direct blow molding.

Example 6

Except for the mixing ratio rate of HDPE-2/LDPE-1/ADPE-2/PA-2=70/10/10/10 (% by mass), a bottle was formed in the same manner as Example 5.

Example 7

Except for using the cylindrical die with the structure of FIG. 3, a bottle was formed in the same manner as Example 2.

Example 8

Except for the mixing ratio rate of HDPE-1/ADPE-1/PA-1=65/20/15 (% by mass), a bottle was formed in the same manner as Example 7.

Example 9

Except for setting the temperature of the die to 215° C., a bottle was formed in the same manner as Example 2.

Example 10

Except for setting the temperature of the die to 240° C., a bottle was formed in the same manner as Example 2.

Example 11

A device for forming a single-layer direct-blow molded container, which is equipped with a 55 mm single shaft extruder, a cylindrical die with the structure of FIG. 1, a mold, a mold clamping device, a cooler, and the like, was used. In the extrusion hopper, dry blend pellets of PP-1/ADPP-1/PA-1=85/10/5 (% by mass) were fed. The extruder cylinder temperature, the temperature of the adaptor, and the die temperature were set to 215 to 240° C., 240° C., and 235° C., respectively. Subsequently, a parison was extruded at a screw rotation speed of 20 rpm. Then, a 400 mL columnar screw-capped bottle with a wall thickness of about 1 mm at the body was formed by direct blow molding.

Example 12

Except for the mixing ratio rate of PP-1/ADPP-1/PA-1=80/10/10 (% by mass), a bottle was formed in the same manner as Example 9.

Comparative Example 1

Figure 5:
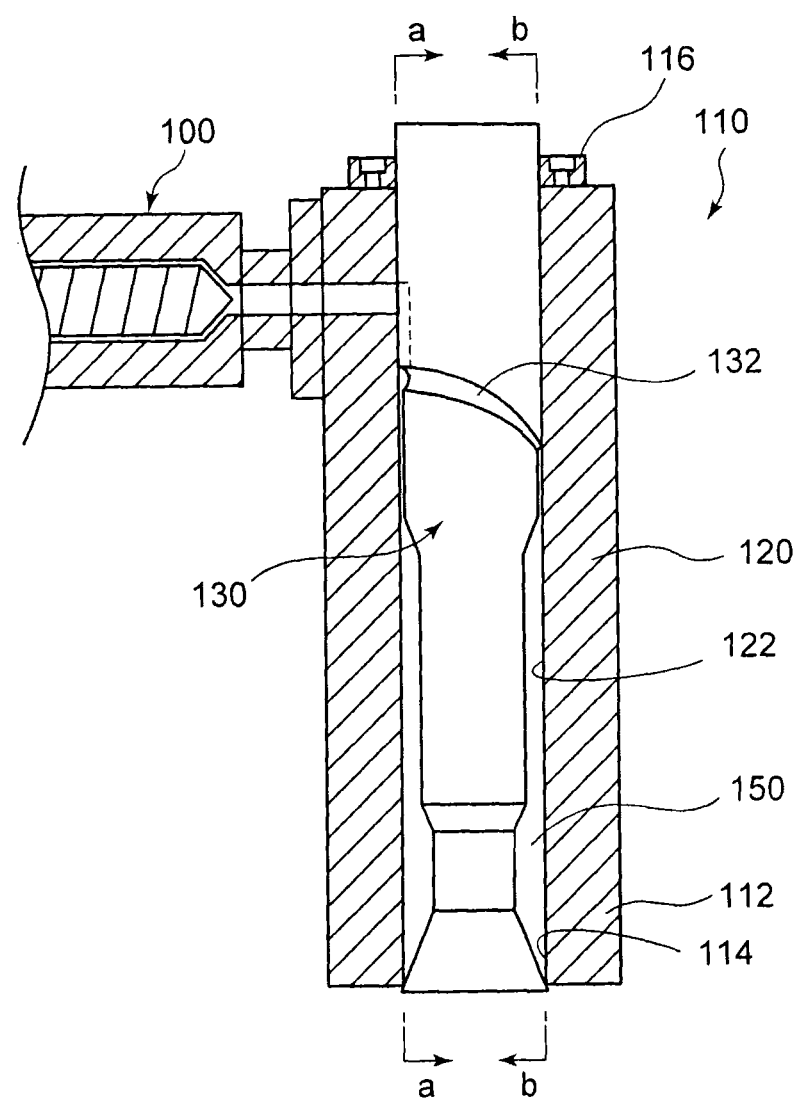
FIG. 5 shows the cross-sectional view of the area around the cylindrical die of a conventional direct blow device.
Figure 6:
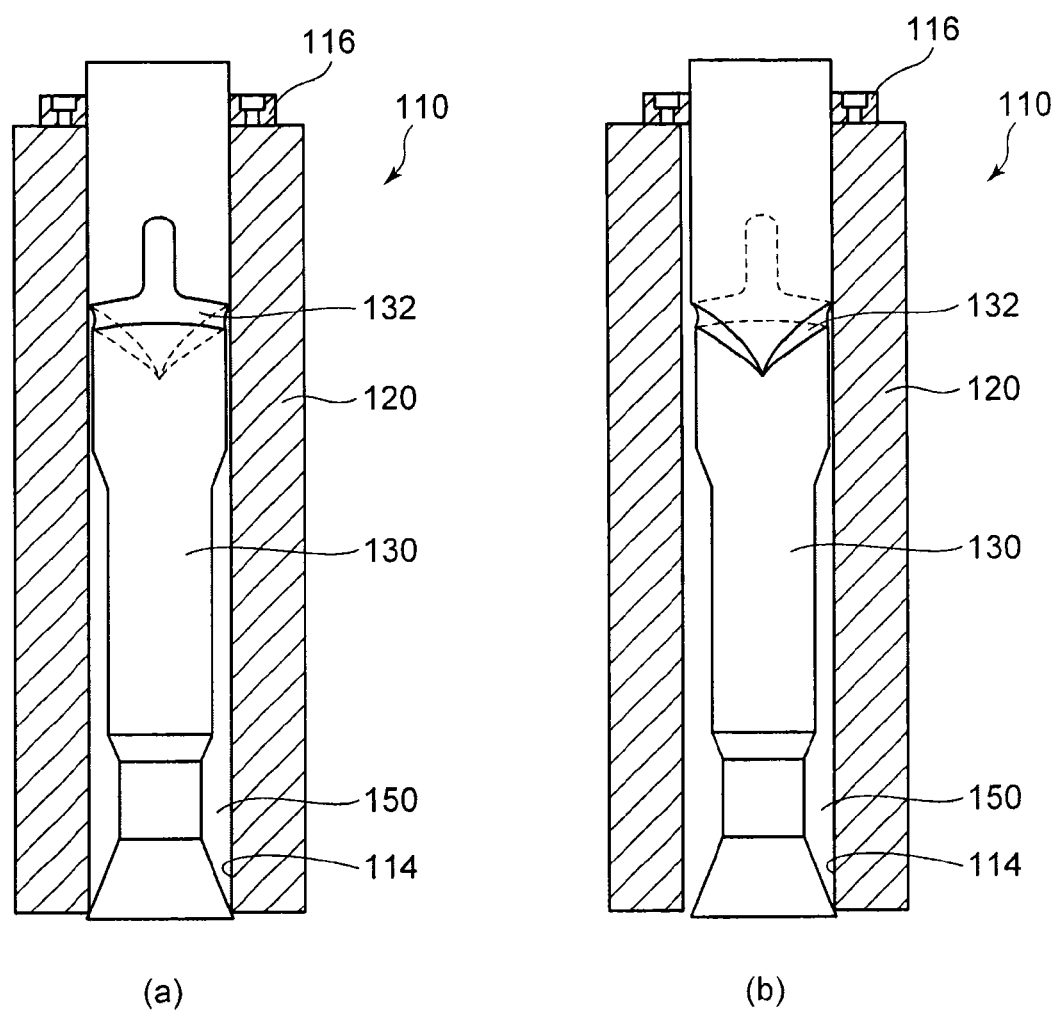
FIG. 6(a) shows the vertical sectional view along the line a-a in FIG. 5.
FIG. 6(b) shows the vertical sectional view along the line b-b in FIG. 5.

A device for forming a single-layer direct-blow molded container, which is equipped with a 55 mm single shaft extruder, a cylindrical die with the structure of FIG. 5, a mold, a mold clamping device, a cooler, and the like, was used. In the extrusion hopper, HDPE-1 was fed. The extruder cylinder temperature, the temperature of the adaptor, and the die temperature were set to 210 to 235° C., 235° C., and 230° C., respectively. Subsequently, a parison was extruded at a screw rotation speed of 20 rpm. Then, a 400 mL columnar screw-capped bottle with a wall thickness of about 1 mm at the body was formed by direct blow molding.

Comparative Example 2

Except for using the cylindrical die with the structure of FIG. 1, a bottle was formed in the same manner as Comparative Example 1.

Comparative Example 3

Except for using the cylindrical die with the structure of FIG. 5, a bottle was formed in the same manner as Example 1.

Comparative Example 4

Except for using the cylindrical die with the structure of FIG. 5, a bottle was formed in the same manner as Example 2.

Comparative Example 5

Except for using the cylindrical die with the structure of FIG. 5, a bottle was formed in the same manner as Example 4.

Comparative Example 6

Except for setting the temperature of the die to 205° C., a bottle was to be formed in the same manner as Example 2. However, the metaxylylene group-containing polyamide (PA-1) solidified in the cylindrical die. Accordingly, the pressure of the extruder header increased, so that no bottle could be formed.

Comparative Example 7

Except for setting the temperature of the die to 250° C., a bottle was formed in the same manner as Example 2.

For the obtained bottles, the dispersion state of the metaxylylene group-containing polyamide in weld was observed, and the dimension, the oxygen transmission rate, and the mass reduction rate of methyl ethyl ketone were measured. The results were shown in Table 1.

TABLE 1

| | Material composition | | | | | | | | |
|---|---|---|---|---|---|---|---|---|---|
| | Polyolefin (A) | | | | Acid-modified polyolefin (B) | | Metaxylylene group-containing polyamide (C) | | Structure of cylindrical die | Temperature of cylindrical die |
| | Type | mass % | Type | mass % | Type | mass % | Type | mass % | | ° C. |
| Example 1 | HDPE-1 | 85 | — | | ADPE-1 | 10 | PA-1 | 5 | FIG. 1 | 230 |
| Example 2 | HDPE-1 | 80 | — | | ADPE-1 | 10 | PA-1 | 10 | FIG. 1 | 230 |
| Example 3 | HDPE-1 | 70 | LDPE-1 | 10 | ADPE-1 | 10 | PA-1 | 10 | FIG. 1 | 230 |
| Example 4 | HDPE-1 | 65 | — | | ADPE-1 | 20 | PA-1 | 15 | FIG. 1 | 230 |
| Example 5 | HDPE-2 | 80 | — | | ADPE-2 | 10 | PA-2 | 10 | FIG. 1 | 225 |
| Example 6 | HDPE-2 | 70 | LDPE-1 | 10 | ADPE-2 | 10 | PA-2 | 10 | FIG. 1 | 225 |
| Example 7 | HDPE-1 | 80 | — | | ADPE-1 | 10 | PA-1 | 10 | FIG. 3 | 230 |
| Example 8 | HDPE-1 | 65 | — | | ADPE-1 | 20 | PA-1 | 15 | FIG. 3 | 230 |
| Example 9 | HDPE-1 | 80 | — | | ADPE-1 | 10 | PA-1 | 10 | FIG. 1 | 215 |
| Example 10 | HDPE-1 | 80 | — | | ADPE-1 | 10 | PA-1 | 10 | FIG. 1 | 240 |
| Example 11 | PP-1 | 85 | — | | ADPP-1 | 10 | PA-1 | 5 | FIG. 1 | 235 |
| Example 12 | PP-1 | 80 | — | | ADPP-1 | 10 | PA-1 | 10 | FIG. 1 | 235 |
| Comparative Example 1 | HDPE-1 | 100 | — | | — | | — | | FIG. 5 | 230 |
| Comparative Example 2 | HDPE-1 | 100 | — | | — | | — | | FIG. 1 | 230 |
| Comparative Example 3 | HDPE-1 | 85 | — | | ADPE-1 | 10 | PA-1 | 5 | FIG. 5 | 230 |
| Comparative Example 4 | HDPE-1 | 80 | — | | ADPE-1 | 10 | PA-1 | 10 | FIG. 5 | 230 |
| Comparative Example 5 | HDPE-1 | 65 | — | | ADPE-1 | 20 | PA-1 | 15 | FIG. 5 | 230 |

TABLE 1-continued

| | | | | | | | | |
|---|---|---|---|---|---|---|---|---|
| Comparative Example 6 | HDPE-1 | 80 | — | ADPE-1 | 10 | PA-1 | 10 | FIG. 1 | 205 |
| Comparative Example 7 | HDPE-1 | 80 | — | ADPE-1 | 10 | PA-1 | 10 | FIG. 1 | 250 |

| | MXD6 in weld | Dimension of container | | | Oxygen transmission rate mL/0.21 atm · day | Mass reduction rate of methyl ethyl ketone % | Remarks |
|---|---|---|---|---|---|---|---|
| | | Pinch-off direction mm | Pinch-off vertical direction mm | Absolute value of dimensional difference mm | | | |
| Example 1 | Existing | 58.4 | 58.5 | 0.1 | 0.11 | 0.08 | |
| Example 2 | Existing | 58.4 | 58.5 | 0.1 | 0.05 | 0.05 | |
| Example 3 | Existing | 58.5 | 58.5 | 0 | 0.03 | 0.03 | |
| Example 4 | Existing | 58.4 | 58.5 | 0.1 | 0.02 | 0.01 | |
| Example 5 | Existing | 58.4 | 58.5 | 0.1 | 0.04 | 0.04 | |
| Example 6 | Existing | 58.5 | 58.5 | 0 | 0.02 | 0.01 | |
| Example 7 | Existing | 58.5 | 58.5 | 0 | 0.05 | 0.05 | |
| Example 8 | Existing | 58.5 | 58.5 | 0 | 0.04 | 0.04 | |
| Example 9 | Existing | 58.4 | 58.5 | 0.1 | 0.05 | 0.05 | |
| Example 10 | Existing | 58.4 | 58.5 | 0.1 | 0.05 | 0.05 | |
| Example 11 | Existing | 58.5 | 58.5 | 0 | 0.14 | 0.10 | |
| Example 12 | Existing | 58.4 | 58.5 | 0.1 | 0.08 | 0.07 | |
| Comparative Example 1 | — | 58.3 | 58.5 | 0.2 | 0.50 | 0.24 | |
| Comparative Example 2 | — | 58.5 | 58.5 | 0 | 0.50 | 0.24 | |
| Comparative Example 3 | None | 57.9 | 58.5 | 0.6 | 0.24 | 0.17 | |
| Comparative Example 4 | None | 57.7 | 58.5 | 0.8 | 0.16 | 0.12 | |
| Comparative Example 5 | None | 57.4 | 58.4 | 1.0 | 0.11 | 0.08 | |
| Comparative Example 6 | — | — | — | — | — | — | Shut down due to the increased pressure of extruder head. |
| Comparative Example 7 | Existing | 58.4 | 58.5 | 0.1 | 0.45 | 0.22 | Dispersibility of layer deteriorated. |

The containers obtained by the method of the present invention significantly improved the oxygen transmission rate and the mass reduction rate of methyl ethyl ketone, compared with typical HDPE containers used in Comparative Examples 1 and 2.

On the other hand, the containers of Comparative Examples 3 to 5 formed without using the mandrel used in the method of the present invention did not have the metaxylylene group-containing polyamide in the weld. Accordingly, the oxygen transmission rate and the mass reduction rate of methyl ethyl ketone were poor.

Furthermore, the deformation of the container was observed. The container of Comparative Example 6 using the cylindrical die with a lower temperature than the setting temperature of the present invention could not be formed because the metaxylylene group-containing polyamide solidified in the cylindrical die.

The container of Comparative Example 7 formed by using the cylindrical die with a higher temperature than the setting temperature of the present invention were poor the oxygen transmission rate and the mass reduction rate of methyl ethyl ketone because the metaxylylene group-containing polyamide did not remain dispersed and layered but minutely dispersed due to the high temperature.

INDUSTRIAL APPLICABILITY

The direct-blow molded container formed by the method of the present invention is practical with no deformation, which has excellent barrier property against fuels, chemicals, various gases including oxygen. The direct-blow molded container manufactured by the method of the present invention is suitably used for fuel tanks of operating machines such as mowers and chainsaws, motorcycles, outboard motors, and cars, containers of various objects including fuels such as gasoline, kerosene, and gas oil, lubricants such as engine oil and brake oil, various sanitary articles such as bleach, detergent, and shampoo, chemical substances such as ethanol and oxydol, various beverages such as vegetable juice and milk beverage, and seasonings, and the like.

Moreover, the direct-blow molded container manufactured by the present invention can be used as a package for storing objects.

REFERENCE SIGNS LIST

10 cylindrical die (die)
20 die body
22 flow hole
24 opening
26 hollow
40 mandrel
41 cylinder part
42 tip
60 support part
62 support
64 ring
100 extruder

The invention claimed is:

1. A method of manufacturing a direct blow-molded container, the container comprising 60 to 90% by mass of a polyolefin (A), 5 to 30% by mass of an acid-modified polyolefin (B), and 2 to 35% by mass of a metaxylylene group-containing polyamide (C), the metaxylylene group-containing polyamide (C) being dispersed and layered in the polyolefin (A), the method comprising:
  using a die provided with
    a die body having a flow hole in which melted resin extruded from an extruder flows and a cylindrical hollow having an opening in a lower side and the flow hole in an upper side, the opening and the flow hole opening downward and upward, respectively, a mandrel having a tip in an upper side, the tip pointing to the opening of the tip of the flow hole, and a support part formed in a flow path clearance so that the flow path clearance formed between the hollow of the die body and the mandrel defining a resin flow path, the support part holding the mandrel in the hollow of the die body;

setting the temperature of the die to fall within a range between a melt beginning temperature and a melt ending temperature of the metaxylylene group-containing polyamide (C), the melt beginning temperature and the melt ending temperature being measured with a differential scanning calorimeter;

feeding melted resin formed by the extruder to the flow hole;

forming the melted resin flowing through the flow hole in a cylindrical shape wrapping around the mandrel by the tip of the mandrel;

passing the cylindrical melted resin through the support part in the flow path clearance to divide the cylindrical melted resin immediately before the support part;

joining the divided resin immediately after the support part so as to form the joined melted resin in a cylindrical shape again; and extruding the cylindrical melted resin from the opening;

to obtain a container comprising 60 to 90% by mass of a polyolefin (A), 5 to 30% by mass of an acid-modified polyolefin (B), and 2 to 35% by mass of a metaxylylene group-containing polyamide (C), the metaxylylene group-containing polyamide (C) being dispersed and layered in the polyolefin (A).

2. The method of claim 1, wherein the support part has a plurality of rod-shaped supports, and the plurality of supports are radially disposed around the mandrel in the flow path clearance.

3. The method of claim 2, wherein the support part further has an enclosed support with a shape of a ring or cylinder, the enclosed support wrapping around the mandrel in the flow pass clearance, among the plurality of supports, a predetermined number of supports formed in the die body hold the external side of the enclosed support, and a predetermined number of supports formed in the mandrel hold the internal side of the enclosed support.

4. The method of claim 1, wherein the flow path clearance defines a flow path with the diameter in the downstream side being smaller than that at the support part.

5. The method of claim 2, wherein the flow path clearance defines a flow path with the diameter in the downstream side being smaller than that at the support part.

6. The method of claim 3, wherein the flow path clearance defines a flow path with the diameter in the downstream side being smaller than that at the support part.

* * * * *